(12) United States Patent
Takashima et al.

(10) Patent No.: US 7,528,841 B2
(45) Date of Patent: May 5, 2009

(54) IMAGE TRANSFORMATION APPARATUS, IMAGE TRANSFORMATION CIRCUIT AND IMAGE TRANSFORMATION METHOD

(75) Inventors: Akihiro Takashima, Kanagawa (JP); Hiroshi Yamauchi, Kanagawa (JP); Hideyuki Shimizu, Kanagawa (JP)

(73) Assignee: Sony Corporation (JP)

( * ) Notice: Subject to any disclaimer, the term of this patent is extended or adjusted under 35 U.S.C. 154(b) by 700 days.

(21) Appl. No.: 11/184,799

(22) Filed: Jul. 20, 2005

(65) Prior Publication Data
US 2006/0022989 A1   Feb. 2, 2006

(30) Foreign Application Priority Data
Jul. 30, 2004   (JP)   ............... 2004-224209

(51) Int. Cl.
G06F 12/02 (2006.01)
G06F 12/06 (2006.01)
G09G 5/00 (2006.01)
G06T 15/20 (2006.01)
G06T 17/00 (2006.01)

(52) U.S. Cl. .................. 345/565; 345/427; 345/428; 345/572; 345/606

(58) Field of Classification Search ............... 345/420, 345/427, 428, 587, 606–612, 565, 572–574
See application file for complete search history.

(56) References Cited

U.S. PATENT DOCUMENTS 5,909,219 A * 6/1999 Dye ........................ 345/582
6,226,012 B1 * 5/2001 Priem et al. ............... 345/606
2003/0117399 A1 * 6/2003 Nagasaki et al. ........... 345/428

FOREIGN PATENT DOCUMENTS

JP   2002-083316   3/2002

* cited by examiner

Primary Examiner—Hau H Nguyen
(74) Attorney, Agent, or Firm—Rader Fishman & Grauer PLLC; Ronald P. Kananen

(57) ABSTRACT

An image transformation apparatus is provided, which includes a modeling unit 5 that calculates the coordinates of vertices of each polygon and calculates a pre-filter coefficient corresponding to a reduction ratio at the position of a vertex of each polygon, with respect to a model to which an image is attached to; a texture address unit 6 that converts the coordinates of vertices of each polygon calculated in the modeling unit 5 into the coordinates of each pixel and sets a read address for attaching an image to the model using the coordinates of each pixel; a filter coefficient unit 7 that converts a pre-filter coefficient calculated in the modeling unit 5 into a pre-filter coefficient at the position of each pixel; an H-direction pre-filter 9, an HV scan converter 10 and a V-direction pre-filter 11 that perform filtering on input image data with a pre-filter coefficient obtained through conversion in the filter coefficient unit 7; a texture memory 13 to which image data filtered in the H-direction pre-filter 9, HV scan converter 10 and V-direction pre-filter 11, is written; and a texture memory controller 12 which reads out image data from the texture memory 13 in accordance with a read address set in the texture address unit 6.

10 Claims, 4 Drawing Sheets

A(s1, t1, q1)
B(s2, t2, q2)
Ps(s, t, q)
C(s3, t3, q3)
32

P0   P1
Ps
P2   P3

$$Ds \frac{K0 \cdot D0 \cdot + K1 \cdot D1 \cdot + K2 \cdot D2 + K3 \cdot D3}{K0 + K1 + K2 + K3}$$

IMAGE TRANSFORMATION APPARATUS, IMAGE TRANSFORMATION CIRCUIT AND IMAGE TRANSFORMATION METHOD

CROSS REFERENCES TO RELATED APPLICATIONS

The present invention contains subject matter related to Japanese Patent Application JP 2004-224209 filed in the Japanese Patent Office on Jul. 30, 2004, the entire contents of which are incorporated herein by reference.

BACKGROUND OF THE INVENTION

1. Field of the Invention

The present invention relates to an apparatus, a circuit and a method wherein an image is transformed by means of texture mapping.

2. Description of the Related Art

In the field of computer graphics, as a technique of transforming an image in a virtual three-dimensional space, a technique called texture mapping is used in which a model that is an object shape and is configured with a combination of triangles called a polygon is made and then an image is attached to the model. Here, in the case where the model is positioned farther than a camera viewpoint in a virtual three-dimensional space, the model is reduced in size.

On this occasion, texture mapping with less aliasing is executed by preparing in advance texture data in which the same image is made to have lower resolution in stages (discretely), and texture data whose reduction ratio is close to that of the model is attached to the model. Typically, an anti-aliasing method according to this technique is called the mipmap method, and texture data lowered in resolution in phases are called mipmap images.

If the reduction ratio in the original state in which an image has not been reduced in size is defined as 1.0 and the reduction ratio when an image has been reduced in size is defined as 0.0 to 0.999 . . . , in the mipmap method, image data with a finite number of reduction ratios reduced by $\frac{1}{2}^n$ (one divided by the n-th power of two), such as 1.0, 0.5, 0.25, 0.125, 0.0625 . . . , are prepared as texture data in a memory. After that, if the reduction ratio of a model is, for example, 0.75, the mipmap data whose reduction ratio is 1.0 and the mipmap data whose reduction ratio is 0.5 are read out from the memory, and further, by linearly interpolating these mipmap data by means of the weighting addition of one half each, texture data whose reduction ratio is 0.75 are calculated (refer to Patent Literature 1, for example).

[Patent Literature 1] Japanese Patent Publication No. 2002-83316 (Paragraph No. 0004)

However, there have been such problems as the following (1) to (3) in executing anti-aliasing in a typical manner by means of the mipmap method.

(1) If the reduction ratio of a model is of other reduction ratios than mipmap data, anti-aliasing may not be appropriately executed, because two mipmap data sets are linearly interpolated as described above. Thus, there occurs aliasing or a blur in an output image.

(2) Since it is necessary to prepare texture data of input image, which have been reduced in size by $\frac{1}{2}^n$, processing time becomes longer and the scale of a circuit is enlarged.

(3) Since approximately twice the amount of input image is required as a texture data amount, such as an input image+ (half the input image)+(a quarter the input image)+(an eighth the input image)+ . . . , a memory having large capacity is required.

SUMMARY OF THE INVENTION

The present invention addresses the above-identified and other problems associated with conventional methods and apparatuses and provides an image transformation apparatus, an image transformation circuit, and an image transformation method, in which when an image is transformed by means of texture mapping, an output image having less aliasing and a high image quality is obtained irrespective of the reduction ratio of a model, and the processing time is made short, the scale of a circuit is small-sized and the capacity of a memory is reduced.

To solve these problems, an image transformation apparatus according to an embodiment of the present invention includes: modeling means which calculates the coordinates of vertices of each polygon and calculate a pre-filter coefficient corresponding to a reduction ratio at the position of a vertex of each polygon, with respect to a model to which an image is attached; read address setting means which converts the coordinates of vertices of each polygon calculated by the modeling means into the coordinates of each pixel and set a read address for attaching an image to a model using the coordinates of each pixel; pre-filter coefficient conversion means which converts a pre-filter coefficient calculated by the modeling means into a pre-filter coefficient at the position of each pixel; pre-filter processing means which performs filtering on input image data with a pre-filter coefficient obtained through conversion by the pre-filter coefficient conversion means; image storage means to which image data filtered by the pre-filter processing means are written; and readout means which reads out image data from the image storage means in accordance with a read address set by the read address setting means.

In this image transformation apparatus, with respect to a model to which an image is attached, after the coordinates of the vertices of each polygon are calculated, the coordinates of the vertices of each polygon are converted into the coordinates of each pixel, and a read address for attaching an image to a model is set using the coordinates of each pixel.

Further, with respect to this model, after a pre-filter coefficient corresponding to a reduction ratio at the position of a vertex of each polygon is calculated, this pre-filter coefficient is converted into a pre-filter coefficient at the position of each pixel.

Further, after input image data are filtered with a pre-filter coefficient at the position of each pixel and are written to the image storage means, the image data are read out from the image storage means in accordance with the set read address, and so an image is attached to a model (an image is transformed).

As described above, according to this image transformation apparatus, input image data to be used as texture data are pre-filtered with a pre-filter coefficient corresponding to a reduction ratio at the position of each pixel of a model. Thus, since optimum pre-filtering in accordance with the reduction ratio of a model is executed, an output image having less aliasing and a high image quality can be obtained, irrespective of the reduction ratio of a model.

Further, since only one texture data set needs to be prepared in accordance with the reduction ratio of a model, processing time can be made short and the scale of a circuit can be small-sized.

Since there is only one texture data set provided as described above and the amount of input image data becomes the amount of texture data, the capacity of a memory (image storage means) can be reduced.

Further, as an embodiment of this image transformation apparatus, it is preferable that the image transformation apparatus further includes address storage means to which a read address set in the read address setting means is written with video data being input to the pre filter processing means and from which the read address is read out by one frame based on a synchronous signal input along with the video data, and the readout means reads out image data from the image storage means in accordance with a read address read out from the address storage means.

Thus, it becomes possible to apply real-time texture mapping to input video data.

Next, an image transformation circuit according to an embodiment of the present invention is mounted on a single substrate and includes: modeling means which calculates the coordinates of vertices of each polygon and calculates a pre-filter coefficient corresponding to a reduction ratio at the position of a vertex of each polygon, with respect to a model to which an image is attached; read address setting means which converts the coordinates of vertices of each polygon calculated by the modeling means into the coordinates of each pixel and sets a read address for attaching an image to a model using the coordinates of each pixel; pre-filter coefficient conversion means which converts a pre-filter coefficient calculated by the modeling means into a pre-filter coefficient at the position of each pixel; pre-filter processing means which performs filtering on input image data with a pre-filter coefficient obtained through conversion by the pre-filter coefficient conversion means; image storage means to which image data filtered by the pre-filter processing means are written; and readout means which reads out image data from the image storage means in accordance with a read address set by the read address setting means.

Furthermore, an image transformation method according to an embodiment of the present invention includes with respect to a model to which an image is attached: a first step of calculating the coordinates of vertices of each polygon and calculating a pre-filter coefficient corresponding to a reduction ratio at the position of a vertex of each polygon; a second step of converting the coordinates of vertices of each polygon calculated in the first step into the coordinates of each pixel and setting a read address for attaching an image to a model using the coordinates of each pixel; a third step of converting a pre-filter coefficient calculated in the first step into a pre-filter coefficient at the position of each pixel; a fourth step of filtering input image data with a pre-filter coefficient obtained through conversion in the third step; a fifth step of writing image data that have been filtered in the fourth step to image storage means; and a sixth step of reading out image data from the image storage means in accordance with a read address set in the second step.

According to the above circuit and method, similarly to the explanation of the above image transformation apparatus according to an embodiment of the present invention, when an image is transformed by means of texture mapping, it is possible to obtain an output image having less aliasing and a high image quality irrespective of the reduction ratio of a model, reduce the processing time, make the scale of a circuit small-sized and reduce the capacity of a memory.

According to embodiments of the present invention, in the case where an image is transformed by means of texture mapping, such effectiveness in which an output image having less aliasing and high image quality is obtained irrespective of the reduction ratio of a model, the processing time is reduced, the scale of a circuit is made small-sized and the capacity of a memory is reduced can be obtained.

Further, such effectiveness in which real-time texture mapping can be applied to input video data can be obtained.

DESCRIPTION OF THE PREFERRED EMBODIMENTS

Figure 1:
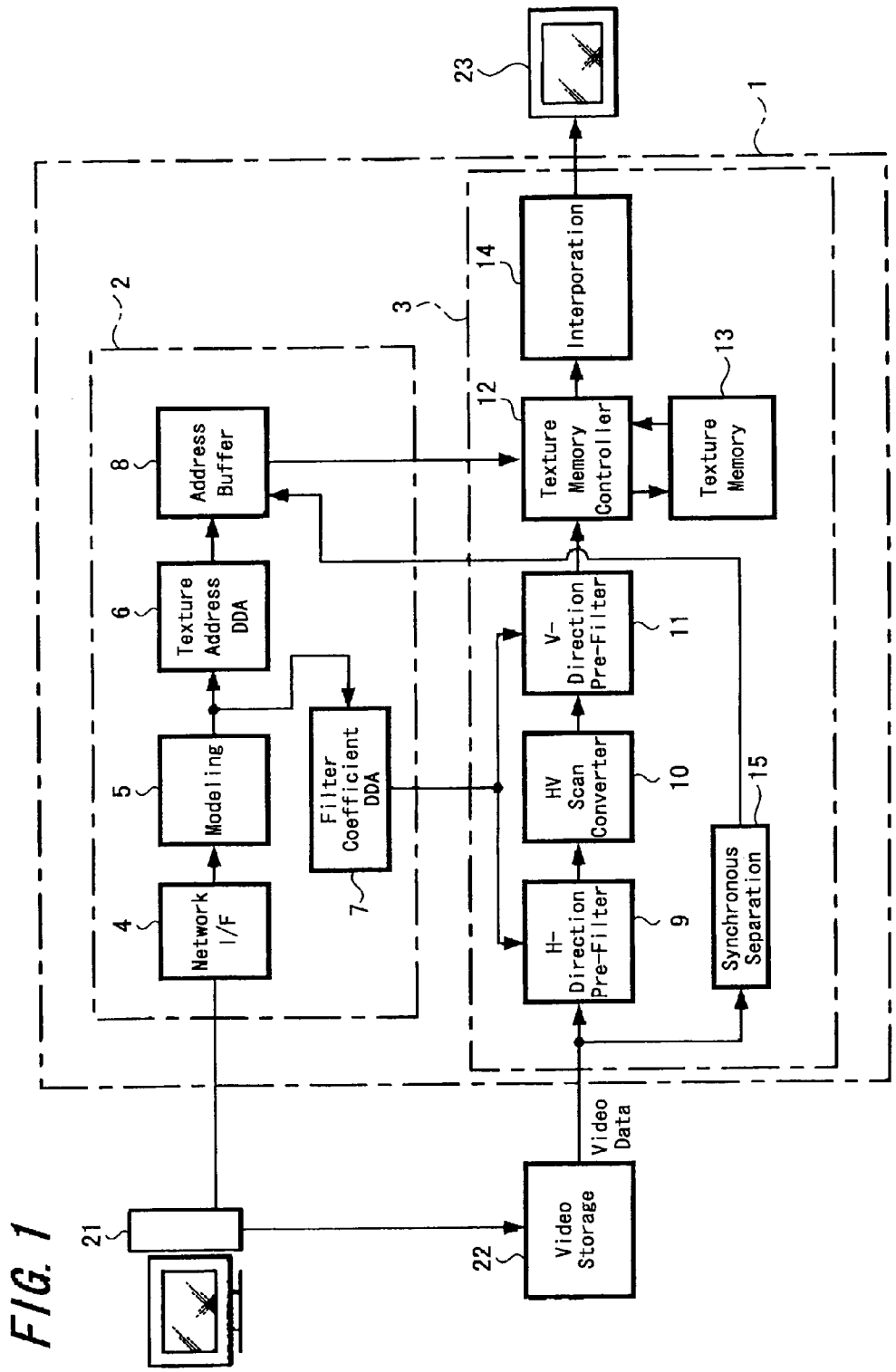
FIG. 1 is a block diagram showing an example of a configuration of an image transformation apparatus according to an embodiment of the present invention.

Hereinafter, embodiments of the present invention are explained in detail, using the figures. FIG. 1 is a block diagram showing an example of a configuration of an image transformation apparatus according to an embodiment of the present invention. An image transformation apparatus 1 is an apparatus of a single unit stored in a chassis, and it broadly includes an address processing block 2 and a video processing block 3.

The address processing block 2 is a block performing a reduction in size and transformation of a model, which includes a network interface 4 for executing communication via the Ethernet®, a modeling unit 5, a texture address DDA (Digital Differential Analyzer) 6, a filter coefficient DDA 7 and an address buffer 8.

The video processing block 3 is a block performing anti-aliasing in order to attach an image to a model transformed by the address processing block 2, and it includes an H-direction pre-filter 9, an HV scan converter 10, a V-direction pre-filter 11, a texture memory controller 12, a texture memory 13, an interpolation unit 14 and a synchronous separation unit 15.

This image transformation apparatus 1 is used as an effecter (apparatus which performs special effects on an image) that is part of a nonlinear editing system in a television broadcasting station, in which the address processing block 2 is connected to an editing terminal (a computer installed with editing software) 21 through the Ethernet®, and the video processing block 3 is connected to a video storage (for example, a VTR or an AV server) 22 and a monitor 23.

Figure 2:
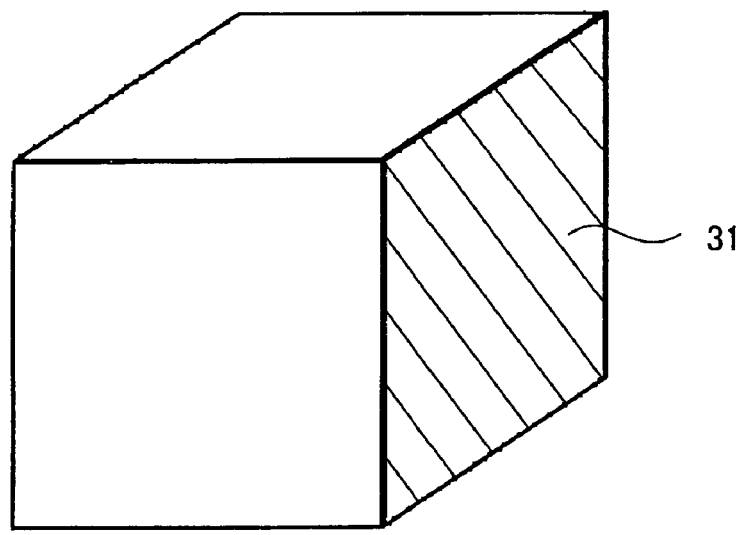
FIG. 2 is a view showing an example of a model to which an image is attached.

In the editing terminal 21, a model to which an image is attached and an image (video data) which is to be transformed are designated based on an operation by an operator. FIG. 2 shows an example of a model designated at the editing terminal 21. A side surface (shown with oblique lines) of a cube diagonally seen is designated as a model 31.

As shown in FIG. 1, from the editing terminal 21, data (wire frame data) showing the shape of this model designated is supplied to the address processing block 2 in the image transformation apparatus 1.

Further, from the editing terminal 21, a command to read out the designated video data is sent to the video storage 22. From the video storage 22, video data read out in accordance with this command are sent to the video processing block 3 in the image transformation apparatus 1.

Figure 3A:
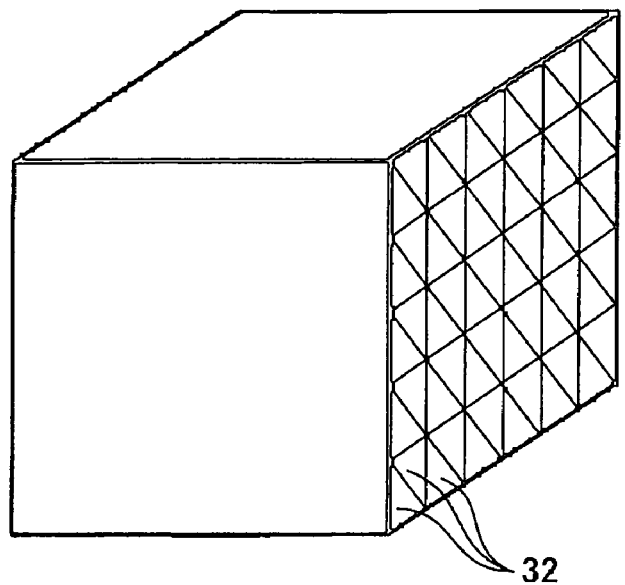
FIGS. 3A and 3B are views showing a polygon and the texture coordinates of vertices thereof.
Figure 3B:
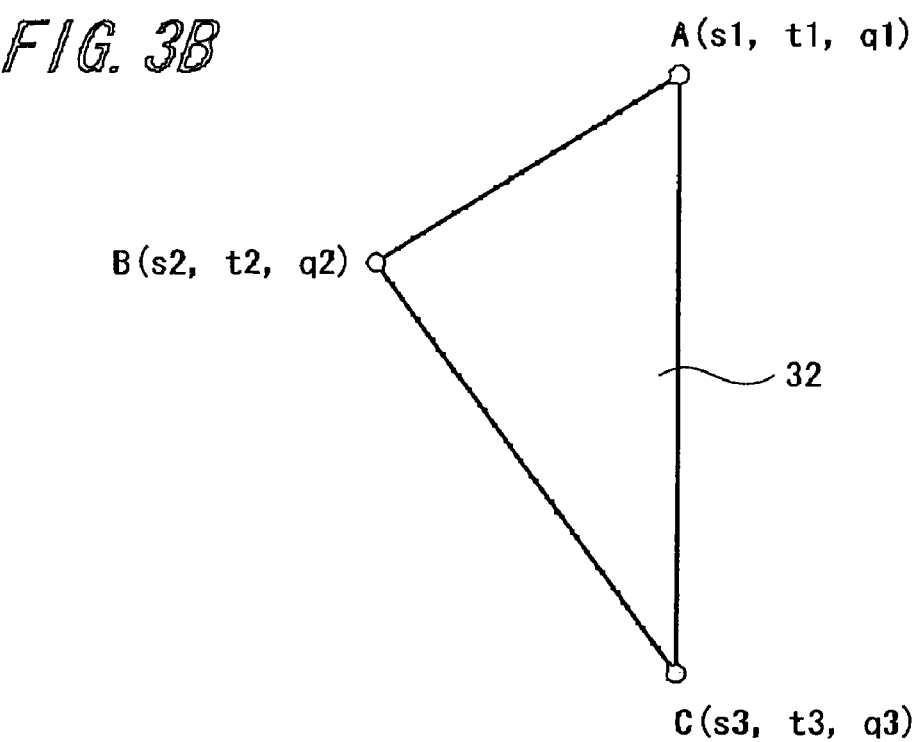

In the address processing block 2, the modeling unit 5 divides a model into a plurality of polygons based on the wire frame data supplied from the editing terminal 21. Then, the texture coordinates of vertices of each polygon are calculated, and a pre-filter coefficient corresponding to a reduction ratio at the position of a vertex of each polygon is calculated. FIG. 3A shows the state in which the model (side surface of a cube) shown in FIG. 2 has been divided into a plurality of polygons 32, and FIG. 3B shows the texture coordinates (s1, t1, q1), (s2, t2, q2) and (s3, t3, q3) of vertices A, B and C of one polygon 32 thereof.

Figures 4, 5:
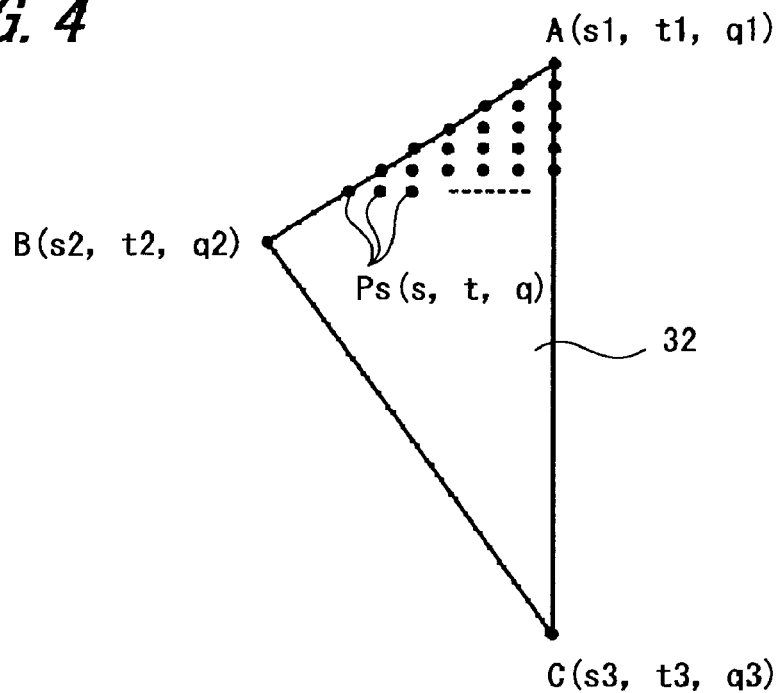
FIG. 4 is a view showing the texture coordinates of each sub-pixel.
FIG. 5 is a figure showing an example of generating data of a sub-pixel.

As shown in FIG. 1, texture coordinates data calculated in the modeling unit 5 are sent to the texture address DDA 6. As shown in FIG. 4, the texture address DDA 6 converts the texture coordinates (s1, t1, q1), (s2, t2, q2) and (s3, t3, q3) of vertices A, B and C of each polygon into the texture coordinates (s, t, q) of each sub-pixel Ps (pixel having resolution higher than that of the video data in the video storage 22) by means of linear interpolation. Then, by executing the calculation of u=s/q, v=t/q, the texture address (u, v) of each sub-pixel is set. This texture address (u, v) is written to the address buffer 8.

A pre-filter coefficient calculated in the modeling unit 5 is sent to the filter coefficient DDA 7. The filter coefficient DDA 7 converts a pre-filter coefficient corresponding to a reduction ratio at the position of a vertex of each polygon into a pre-filter coefficient corresponding to a reduction ratio at the position of each pixel (pixel having resolution equal to that of the video data in the video storage 22) by means of linear interpolation. The pre-filter coefficient obtained through conversion in the filter coefficient DDA 7 is sent to the H-direction pre-filter 9 and the V-direction pre-filter 11 in the video processing block 3.

In the video processing block 3, the H-direction pre-filter 9 performs filtering on video data sent from the video storage 22 by pixel in the horizontal direction on the screen with a pre-filter coefficient from the filter coefficient DDA 7.

Video data to which filtering is performed by the H-direction pre-filter 9 is sent to the HV scan converter 10. After writing image data of one frame to a memory inside, the HV scan converter 10 reads out data of each pixel from the memory in a vertical direction on the screen to scan and convert video data.

Video data scanned and converted by the HV scan converter 10 are sent to the V-direction pre-filter 11. The V-direction pre-filter 11 performs filtering on the video data in a vertical direction by pixel with a pre-filter coefficient from the filter coefficient DDA 7.

Video data to which filtering is performed in the V-direction pre-filter 11 are written to the texture memory 13 through the texture memory controller 12.

Further, in the video processing block 3, the synchronous separation unit 15 separates a vertical synchronous signal from video data sent from the video storage 22 and sends the signal to the address buffer 8 in the address processing block 2. From the address buffer 8, in synchronization with this vertical synchronous signal, a texture address (u, v) of each sub-pixel is read out by one frame and sent to the texture memory controller 12 within the video processing block 3.

The texture memory controller 12 makes a texture address (u, v) of each sub-pixel from the address buffer 8 as a read address and reads out from the texture memory 13 a plurality of (four or eight) pixel data in the vicinity of each sub-pixel.

Data read out from the texture memory 13 are sent from the texture memory controller 12 to the interpolation unit 14. The interpolation unit 14 generates data of each sub-pixel by linearly interpolating a plurality of pixel data in the vicinity of each sub-pixel. FIG. 5 shows an example of generating data of a sub-pixel. In this example, data D0 to D3 of four pixels P0 to P3 in the vicinity of a sub-pixel Ps are read out from the texture memory 13, and by linearly interpolating the data D0 to D3 with weighting addition coefficients K0 to K3 corresponding to the distances between the sub-pixel Ps and the pixels P0 to P3, data Ds of the sub-pixel Ps is generated.

As shown in FIG. 1, data of each sub-pixel generated in the interpolation unit 14 is sent from the image transformation apparatus 1 to the monitor 23 and is displayed on the monitor 23.

In this image transformation apparatus 1, with respect to a model to which an image is attached, after the coordinates of vertices of each polygon are calculated by the modeling unit 5, the coordinates of the vertices of each polygon are converted into the coordinates of each pixel in the texture address DDA 6, and a texture address that is a read address for attaching an image to a model is set using the coordinates of each pixel.

Further, with respect to this model, after a pre-filter coefficient corresponding to a reduction ratio at the position of a vertex of each polygon is calculated by the modeling unit 5, this pre-filter coefficient is converted into a pre-filter coefficient at the position of each pixel in the filter coefficient DDA 7.

Then, after input video data, to which filtering is performed with a pre-filter coefficient at the position of each pixel in the H-direction pre-filter 9 and in the V-direction pre-filter 11, is written to the texture memory 13, an image is attached to a model (an image is transformed) by the video data being read out from the texture memory 13 in accordance with a texture address which has been set.

As described above, according to this image transformation apparatus 1, input image data to which pre-filtering is performed with a pre-filter coefficient corresponding to a reduction ratio at the position of each pixel of a model are used as texture data. Thus, since optimum pre-filtering in accordance with the reduction ratio of a model is executed, an output image having less aliasing and a high image quality can be obtained irrespective of the reduction ratio of a model, as compared with the mipmap method in which texture data with reduction ratios in stages (discretely) are prepared.

Further, since only one texture data set needs to be prepared in accordance with the reduction ratio of a model, the processing time can be made short and the scale of a circuit can be made small, in comparison with the mipmap method in which a series of texture data sets reduced in size by $½^n$ are prepared for an input image.

Since there is only one texture data set as described above and the amount of input image data becomes the amount of texture data, the capacity of a memory (texture memory 13) can be reduced in comparison with the mipmap method in which a texture data amount is approximately twice the amount of an input image.

Further, according to this image transformation apparatus 1, since a texture address is read out from the address buffer 8 by one frame in synchronization with a vertical synchronous signal separated from input video data and is sent to the texture memory controller 12, after being written to the address buffer 8, it is possible to apply real-time texture mapping to input video data.

Note that although video data are input to the image transformation apparatus 1 in the embodiment above, other than that, still image data and data produced by means of or computer graphics may be input to the image transformation apparatus 1. If still image data are input, real-time nature is not required, so that the address buffer 8 may be omitted, allowing a texture address set in the texture address DDA 6 to be directly sent to the texture memory controller 12.

Further, in the embodiment above, the image transformation apparatus 1 as a single apparatus connected to the editing terminal 21 by means of the Ethernet® has been explained. However, as another embodiment, an image transformation circuit in which the same elements constituting this image transformation apparatus 1 are mounted on a single substrate may be produced, and the image transformation circuit may be installed in a slot of the editing terminal 21.

Furthermore, in the above embodiments, the present invention is applied to an effecter that is part of a nonlinear editing system. However, the present invention is not limited thereto and may also be applied to a computer game apparatus, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An image transformation apparatus comprising:
   modeling means which calculate, with respect to a model to which an image is attached, the coordinates of vertices of each polygon and calculate a pre-filter coefficient corresponding to a reduction ratio at the position of a vertex of each polygon;
   read address setting means which convert the coordinates of vertices of each polygon calculated by said modeling means into the coordinates of each pixel and which set a read address for attaching an image to said model using said coordinates of each pixel;
   pre-filter coefficient conversion means which convert a pre-filter coefficient calculated by said modeling means into a pre-filter coefficient at the position of each pixel;
   pre-filter processing means which perform filtering on input image data with a pre-filter coefficient obtained through conversion by said pre-filter coefficient conversion means;
   image storage means to which image data filtered by said pre-filter processing means is written;
   readout means which read out image data from said image memory means in accordance with a read address set by said read address setting means; and
   address storage means to which a read address set in said read address setting means is written with video data being input to said pre-filter processing means, and from which the read address is read out by one frame based on a synchronous signal input along with said video data;
   wherein said readout means read out image data from said image storage means in accordance with a read address read out from said address storage means,
   wherein resolution of said coordinates of each pixel in said read address setting means is higher than that of said input video data, and
   wherein resolution of said position of each pixel in said pre-filter coefficient conversion means is equal to that of said input video data.

2. The image transformation apparatus according to claim 1, further comprising:
   interpolation means which generate, in accordance with a read address read out from said address storage means, image data of said read address using a plurality of image data in the vicinity thereof that are read out from said image storage means.

3. The image transformation apparatus according to claim 2, wherein
   said plurality of image data in the vicinity thereof are either four or eight sets of image data.

4. An image transformation circuit mounted on a single substrate, comprising:
   modeling means which calculate, with respect to a model to which an image is attached, the coordinates of vertices of each polygon and calculate a pre-filter coefficient corresponding to a reduction ratio at the position of a vertex of each polygon;
   read address setting means which convert the coordinates of vertices of each polygon calculated by said modeling means into the coordinates of each pixel and which set a read address for attaching an image to said model using the coordinates of said each pixel;
   pre-filter coefficient conversion means which convert a pre-filter coefficient calculated by said modeling means into a pre-filter coefficient at the position of each pixel;
   pre-filter processing means which perform filtering on input image data with a pre-filter coefficient obtained through conversion by said pre-filter coefficient conversion means;
   image storage means to which image data filtered by said pre-filter processing means is written;
   readout means which read out image data from said image memory means in accordance with a read address set by said read address setting means; and
   address storage means to which a read address set in said read address setting means is written with video data being input to said pre-filter processing means, and from which a read address is read out by one frame based on a synchronous signal input along with said video data,
   wherein said readout means read out image data from said image storage means in accordance with a read address read out from said address storage means
   wherein resolution of said coordinates of each pixel in said read address setting means are higher than that of said input video data, and
   wherein resolution of said position of each pixel in said pre-filter coefficient conversion means is equal to that of said input video data.

5. The image transformation circuit according to claim 4, further comprising:
   interpolation means which generate, in accordance with a read address read out from said address storage means, image data of said read address using a plurality of image data in the vicinity thereof that are read out from said image storage means.

6. The image transformation circuit according to claim 5, wherein
   said plurality of image data in the vicinity thereof are either four or eight sets of image data.

7. An image transformation method comprising:
   a first step of calculating, with respect to a model to which an image is attached, the coordinates of vertices of each polygon and of calculating a pre-filter coefficient corresponding to a reduction ratio at the position of a vertex of each polygon;
   a second step of converting the coordinates of vertices of each polygon calculated in said first step into the coordinates of each pixel, and of setting a read address for attaching an image to said model using the coordinates of said each pixel;
   a third step of converting a pre-filter coefficient calculated in said first step into a pre-filter coefficient at the position of each pixel;
   a fourth step of filtering input image data with a pre-filter coefficient obtained through conversion in said third step;
   a fifth step of writing image data filtered in said fourth step to image storage means; and a sixth step of reading out image data from said image storage means in accordance with a read address set in said second step;

wherein in said fourth step, video data is input, wherein in said second step, a read address that has been set is written into address storage means, and the read address is read out from said address storage means by one frame based on a synchronous signal input along with said video data, wherein in said sixth step, image data is read out from said image storage means in accordance with a read address read out from said address storage means, wherein resolution of said coordinates of each pixel in said second step are higher than that of said input video data, and wherein resolution of said position of each pixel in said third step is equal to that of said input video data.

8. An image transformation method according to claim 7, further comprising:

a seventh step of generating, in accordance with a read address read out from said address storage means, image data of said read address by means of interpolation using a plurality of image data in the vicinity thereof that are read out from said image storage means.

9. An image transformation method according to claim 8, wherein said plurality of image data in the vicinity thereof are either four or eight image data sets.

10. An image transformation apparatus comprising:

a modeling unit which calculates, with respect to a model to which an image is attached, the coordinates of vertices of each polygon and calculates a pre-filter coefficient corresponding to a reduction ratio at the position of a vertex of each polygon;

a read address setting unit which converts the coordinates of vertices of each polygon calculated by said modeling unit into the coordinates of each pixel and sets a read address for attaching an image to said model using the coordinates of said each pixel;

a pre-filter coefficient conversion unit which converts a pre-filter coefficient calculated by said modeling unit into a pre-filter coefficient at the position of each pixel;

a pre-filter processing unit which performs filtering on input image data with a pre-filter coefficient obtained through conversion by said pre-filter coefficient conversion unit;

an image storage unit to which image data filtered by said pre-filter processing unit is written; and a readout unit which reads out image data from said image storage unit in accordance with a read address set by said read address setting unit an address storage unit to which a read address set in said read address setting unit is written with video data being input to said pre-filter processing unit, and from which the read address is read out by one frame based on a synchronous signal input along with said video data;

wherein said readout unit read out image data from said image storage unit in accordance with a read address read out from said address storage unit, wherein resolution of said coordinates of each pixel in said read address setting unit is higher than that of said input video data, and wherein resolution of said position of each pixel in said pre-filter coefficient conversion unit is equal to that of said input video data.

* * * * *